US012458995B2

(12) United States Patent
Metzler et al.

(10) Patent No.: US 12,458,995 B2
(45) Date of Patent: Nov. 4, 2025

(54) METHOD AND DEVICE FOR STRIPPING A MATERIAL RESIDUE FROM A METERING NOZZLE

(71) Applicant: Henkel AG & Co. KGaA, Duesseldorf (DE)

(72) Inventors: Mario Metzler, Lustenau (AT); Sven Kekeritz, Altusried (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 18/211,421

(22) Filed: Jun. 19, 2023

(65) Prior Publication Data

US 2023/0330707 A1 Oct. 19, 2023

Related U.S. Application Data

(63) Continuation of application No. PCT/EP2021/085712, filed on Dec. 14, 2021.

(30) Foreign Application Priority Data

Dec. 18, 2020 (EP) .................................... 20215723

(51) Int. Cl.
*B05B 15/52* (2018.01)
*B08B 1/16* (2024.01)
(Continued)

(52) U.S. Cl.
CPC .............. *B05B 15/52* (2018.02); *B08B 1/165* (2024.01); *B08B 1/34* (2024.01); *B08B 9/02* (2013.01); *B08B 9/093* (2013.01)

(58) Field of Classification Search
CPC ........... B08B 1/165; B08B 9/02; B08B 9/093; B08B 1/34; B05B 15/52
See application file for complete search history.

(56) References Cited

U.S. PATENT DOCUMENTS 5,853,812 A 12/1998 Kawasaki et al.
2003/0127046 A1* 7/2003 Zehner ...................... B08B 1/34 118/302
(Continued)

FOREIGN PATENT DOCUMENTS

DE 19847713 A1 4/2000
DE 102006054622 A1 5/2008
(Continued)

OTHER PUBLICATIONS

Machine translation of DE 19847713 (Year: 1998).*
PCT International Search Report—WO PCT/EP2021/085712—Mailing date: Mar. 18, 2022.

*Primary Examiner* — Erin F Bergner
(74) *Attorney, Agent, or Firm* — Steven C. Bauman

(57) ABSTRACT

The invention relates to a method for stripping a material residue from a metering nozzle, wherein the metering nozzle with the material residue is guided past a stripping element such that the material residue comes into contact with the stripping element and is stripped from the metering nozzle, characterized in that the stripping element performs a closed rotational movement by means of which a segment of the stripping element first of all reaches a stripping position, in which the material residue is stripped from the metering nozzle and at least some of the material residue remains adhering on the segment, is then guided with the material residue adhering thereon to a separating position, in which a separating unit is used to separate the material residue from the segment of the stripping element, and is guided back to the stripping position to receive a further material residue. Furthermore, the invention also relates to a device for stripping the material residue.

12 Claims, 2 Drawing Sheets

(51) Int. Cl.

| | |
|---|---|
| ***B08B 1/34*** | (2024.01) |
| ***B08B 9/02*** | (2006.01) |
| ***B08B 9/093*** | (2006.01) |

(56) References Cited

U.S. PATENT DOCUMENTS

| | | | | |
|---|---|---|---|---|
| 2008/0239422 | A1* | 10/2008 | Noda | G02B 27/0172<br>359/13 |
| 2017/0368582 | A1* | 12/2017 | Zackson | B25G 3/38 |

FOREIGN PATENT DOCUMENTS

| | | | |
|---|---|---|---|
| FR | 2722674 | A1 | 1/1996 |
| JP | H07237756 | A | 9/1995 |
| KR | 20100059240 | A | 6/2010 |

* cited by examiner

METHOD AND DEVICE FOR STRIPPING A MATERIAL RESIDUE FROM A METERING NOZZLE

FIELD OF INVENTION

The invention relates to a method and a device for stripping a material residue from a metering nozzle.

Sealing or adhesive materials are often applied industrially by means of a metering nozzle. At the end of the metering, depending on the rheology of the material, adhesion of a material residue in the form of a thread to the metering nozzle occurs. This thread can lead to contamination of the substrate/component if it is unintentionally dropped or is deposited in an uncontrolled manner at the beginning of the next metering. This is very undesirable in particular in visible components or components from the electronics industry.

BACKGROUND

It is known from the prior art to pass the metering nozzle just above a stripping element in the form of a tensioned wire, transversely to the wire, by means of a robot movement after the metering has been completed, for example after the application of an adhesive bead. In this case, the material residue hanging down on the metering nozzle comes into contact with the wire and becomes attached thereto, such that the material residue is stripped from the metering nozzle. In each new stripping process, the metering nozzle is guided over the stripping wire with a small lateral offset with respect to the previous stripping process. Thus, a collision of the metering nozzle with residual material from the previous stripping is prevented. After a certain time, the wire must be cleaned in a complex manner or replaced with a new wire. In particular if a material residue is stripped from the metering nozzle after each metering process or each adhesive bead, the cleaning or the replacement of the wire leads to high equipment costs.

DE 20 2005 005 613 U1 discloses heating the wire for stripping the material residue. As a result, the material residues adhering on the wire burn. However, gases which are toxic and detrimental to health may be produced in this case. In addition, there is a risk of combustion from the hot wire.

The problem addressed by the invention is therefore that of providing a method for stripping a material residue from a metering nozzle, which method operates reliably and safely and can be carried out in a cost-effective manner.

The problem addressed by the invention is solved by the combination of features according to claim 1. Embodiments of the invention can be found in the dependent claims of claim 1.

SUMMARY OF THE INVENTION

According to the invention, the stripping element performs a closed rotational movement by means of which a segment of the stripping element first reaches a stripping position. In the stripping position, the material residue is stripped from the metering nozzle and at least some of the material residue becomes attached to the segment. Thereafter, the segment with the material residue adhering thereon is guided to a separating position in which a separating unit is used to separate the material residue from the segment of the stripping element. Finally, the segment freed from the material residue is guided back to the stripping position and is ready to receive a further material residue.

The rotating stripping element can consist of a plurality of segments which are arranged one behind the other as viewed in the circumferential direction. The segments are successively guided into the stripping position and then into the separating position by the rotational movement. Due to the closed rotational movement and the separating unit, the effective length of the stripping element (sum of the free segments onto which a material residue can be deposited) is infinitely large. The stripping element can be used continuously for long periods of time. Downtimes due to the cleaning or the replacement of the stripping element can be prevented or at least significantly reduced.

A sealing or adhesive material can be metered by means of the metering nozzle. During metering, the sealing or adhesive material is flowable and is not yet hardened. As a rule, the material residue adhering on the metering nozzle, which is deposited on the segment by the stripping process, is not yet in the hardened state either. Depending on the rotational speed at which the stripping element rotates, the segment requires a certain amount of time from the stripping position to the separating position, in which the initially not yet hardened material residue can at least partially harden. Preferably, the material residue reaches the separating position in a hardened state or at least with a hardened surface skin. The separation of the material residue from the segment preferably takes place mechanically, i.e., the material residue is separated (for example, cut, sheared or scraped) from the segment by a mechanical force acting on said residue.

In one embodiment, the time span for a rotational movement of the segment from the stripping position to the separating position is greater than the tack-free time or greater than twice the tack-free time of the material residue. The term “tack-free time” is in this case to be understood to be the time that elapses from the point in time at which the material residue is received on the segment to the point in time at which the surface skin of the material residue has hardened. Insofar as it is adhesive material that is metered and thus also forms the material residue, the material residue in the case of a hardened surface skin is no longer tacky and can be mechanically separated from the segment without the risk of the separating unit becoming clogged with a tacky mass over time and then no longer functioning reliably.

When defining an advantageous rotation time for a complete rotation of the stripping element, different parameters can be taken into account, such as the size and extension of the stripping element, the number of material residues to be stripped per unit of time and the material properties of the material residue. The rotation time can be, for example, in a range from 10 minutes to 24 hours.

The rotational movement can be a rotary movement about an axis of rotation. The stripping element is preferably designed substantially as a rotationally symmetrical body, which notes about the axis of rotation. A complete rotation of the stripping element is achieved when the stripping element has rotated 360°. The rotationally symmetrical body can be divided into a plurality of (rotating) segments having an equal angle of rotation in each case. For example, a cylinder can be divided into 72 segments of equal size, which each cover a rotational angle range of 5° when viewed in the direction of rotation.

Alternatively, the stripping element can have a closed but flexible circumference. An example of this is a closed wire loop which is tensioned on two rollers spaced apart from one another.

In one embodiment, the rotational movement is clocked. This means that the stripping element is stationary for a certain time and is moved further in the circumferential direction in a clocked manner. If, for example, the rotational movement is a rotary movement, the stationary time can be 20 to 120 seconds, the stripping element being further rotated by a few rotational angle degrees (1, for example, 10°) after said time has elapsed. Alternatively, the rotational movement can also be continuous.

The rotating stripping element can be driven by a pivot drive. If a compressed air network is present, a pneumatically driven pivot drive is a cost-effective and easily controllable drive for the stripping element. The pivot drive provides a limited rotary or pivoting movement in a first direction of rotation, which is followed by a rotary movement in an opposite second direction of rotation.

In one embodiment, the pivot drive is coupled to the rotating stripping element via a freewheel. The pivot drive drives the stripping element in the direction of the first direction of rotation in a clocked manner, the stripping element, by means of the freewheel, being decoupled from the pivot drive and not moved during the rotary movement of the pivot drive in the opposite second direction of rotation. By means of a suitable transmission, the stripping element can be moved by a few millimeters (for example 1 to 8 mm) or by a few rotational angle degrees (for example 1 to 10°) per rotary movement of the pivot drive in the first direction of rotation. If, for example, the stripping element is moved rotationally by 4° for each rotary movement of the pivot drive in the first direction of rotation, 90 rotary or pivoting movements in the first direction of rotation are required in order to allow the stripping element to rotate completely once. Between the 90 rotary movements in the first direction of rotation, there is a corresponding number of rotary movements of the pivot drive in the second direction of rotation, with the stripping element remaining stationary due to the freewheel.

As an alternative to the pivot drive, an electric motor (stepper motor or servomotor) can also be used.

The stripping element can be at least partially coated with an anti-adhesion material in order to facilitate separation of the material residue from the segment or from the stripping element. One example of a preferred anti-adhesion material is PTFE.

Alternatively, the stripping element can be made of an anti-adhesion material such as PTFE. If the stripping element is a one-piece component, it can consist entirely of the anti-adhesion material.

The separating unit can have at least one first scraping blade which rests against the rotating stripping element such that the material residue applied to the segment is pressed against the scraping blade by the rotational movement of the stripping element. The scraping blade in this case separates the material residue from the segment or from the stripping element. The scraping blade is preferably stationary, so that the relative movement between the segment/material residue and the scraping blade is only due to the rotational movement of the stripping element. It is also conceivable that the scraping blade additionally performs its own separating or scraping movement.

The separated material residue can be guided into a collecting container. In one embodiment, the separated material residue falls into the collecting container due to gravity. The size of the collecting container can be such that it only needs to be emptied at very great intervals. Another possibility is that of providing the separated material residues to a conveyor belt which transports the material residues continuously or in a clocked manner.

If the material residue remains adhered to the segment substantially in the form of an elongate thread, the thread can be guided successively to the scraping blade in the separating position. This means that the thread is successively separated from the segment along its longitudinal extension by means of the scraping blade. High force peaks during the separating process can thus be prevented. This reduces the maximum required torque for driving the rotating stripping element and the maximum forces that act on the separating unit and on the stripping element during the separation.

Downstream of the stripping position and upstream of the separating position, the material residue can be subjected to water, steam and/or heat. If the material discharged by the metering nozzle is a single-component adhesive which is hardened more quickly by steam or water, the reaction of the material residue located on the segment can be accelerated using steam/humidity by spraying with a water mist. If the material is a two-component adhesive of which the components react faster at an elevated temperature, the stripping element can be heated. At an increased temperature level, the two-component adhesive or at least its surface skin hardens more quickly, which reduces the risk of the separating unit becoming clogged with a tacky mass over time. As a result of the supply of heat, the time required for (partial) hardening of the material residue between the stripping position and the separating position can thus be reduced.

Another object of the invention is that of providing a simply constructed and efficiently operating device for stripping the material residue from the metering nozzle using the combination of features according to claim 11. Embodiments thereof can be found in the dependent claims of claim 11.

The device according to the invention has a stripping disc which is rotatably mounted about an axis of rotation and is used to receive the material residue stripped from the metering nozzle, and a separating unit having at least one preferably fixed scraping blade which rests against the stripping disc, it being possible for the received material residue to be separated by the scraping blade when the stripping disc rotates about the axis of rotation. The abutment of the scraping blade on the stripping disc can be subject to play. Alternatively, the scraping blade can also press against the stripping disc with a certain preload in order to guarantee a separation of the material residue from the stripping disc that is as complete as possible. Although the preload between the scraping blade and the stripping disc increases the friction which counteracts the rotary movement of the stripping disc and must be overcome by the drive of the stripping disc, as a result of a certain degree of friction, in particular in the case of a clocked rotational movement, the stripping disc can be more precisely guided. Without any frictional resistance, in an embodiment in which a freewheel is provided between the stripping disc and the pivot operation, the stripping disc could move beyond the desired target position in the case of an angular momentum provided by the drive, due to the inertia. As an alternative or in addition to the preload between the scraping blade and the stripping disc, the device according to the invention can have a resistance and grinding element which provides a certain (frictional) resistance to the rotational movement of the stripping disc.

The separating unit can have a U-shaped scraping blade having two blade legs and a blade base, the two blade legs resting against a front and a rear main surface of the stripping disc, respectively, and the blade base resting against a lateral surface of the stripping disc. The U-shaped scraping blade makes it possible to free practically the entire surface of the stripping disc from material residues adhering thereon.

In one embodiment, the blade legs extend from the blade base substantially radially in the direction of the axis of rotation of the stripping disc. A main extension of the blade legs and a radial connecting line between the axis of rotation and the blade base can enclose an angle which can assume values from 0 to 30°. The free end of the blade legs is therefore not directed directly onto the axis of rotation of the stripping disc, but has a certain offset with respect to the axis of rotation. By means of this angle or this offset, a material residue in the form of a thread, which extends radially on one of the main surfaces of the stripping disc, can be separated successively from the main surface of the stripping disc by the blade legs.

The blade legs can be of equal length or can also have different lengths. For example, the blade leg arranged on the main surface of the stripping disc that faces the drive of the stripping disc can be somewhat shorter.

In another embodiment, the separating unit has an L-shaped scraping blade having two blade legs, one blade leg resting against the front main surface and the other blade leg resting against the lateral surface of the stripping disc. As in the case of the U-shaped scraping blade, in the case of the L-shaped scraping blade, the blade leg that rests against the front main surface can have a certain offset with respect to the axis of rotation. An angle between this blade leg and the radial connecting line between the axis of rotation and the corner point of the L-shaped scraping blade can assume values between 0 and 30°. The blade leg resting against the main surface is preferably longer than the blade leg resting against the lateral surface.

BRIEF DESCRIPTION OF THE DRAWINGS

The invention is explained in more detail with reference to the embodiments shown in the drawings. In the drawings.

DETAILED DESCRIPTION OF THE INVENTION

Figure 2:
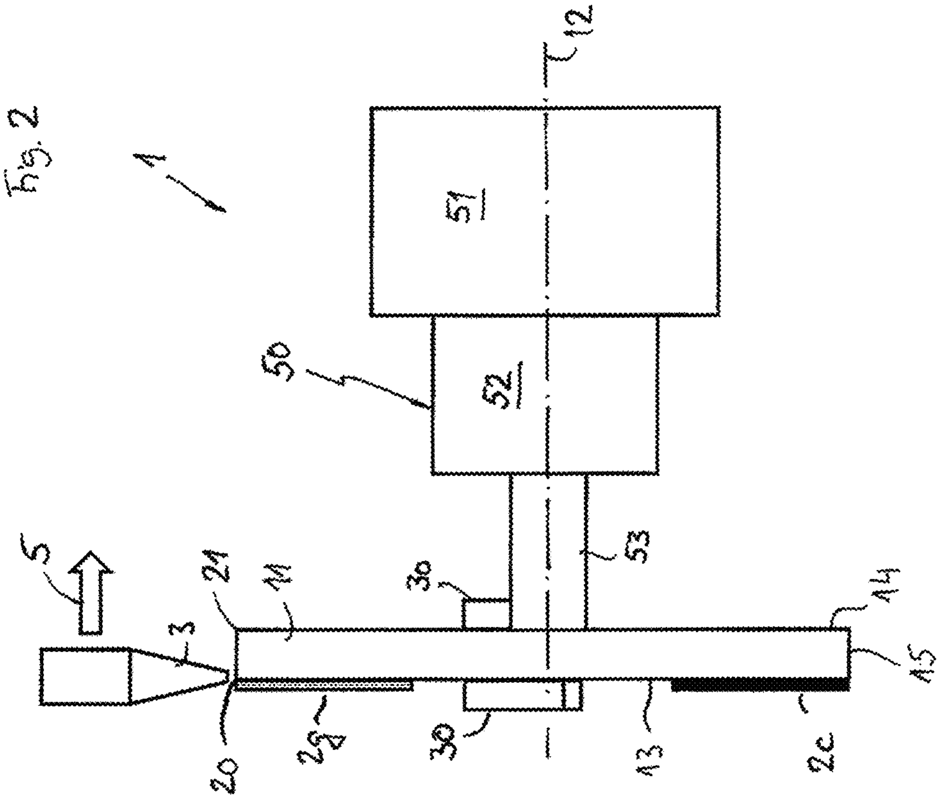
FIG. 2 shows the embodiment from FIG. 1 from the side.
Figure 1:
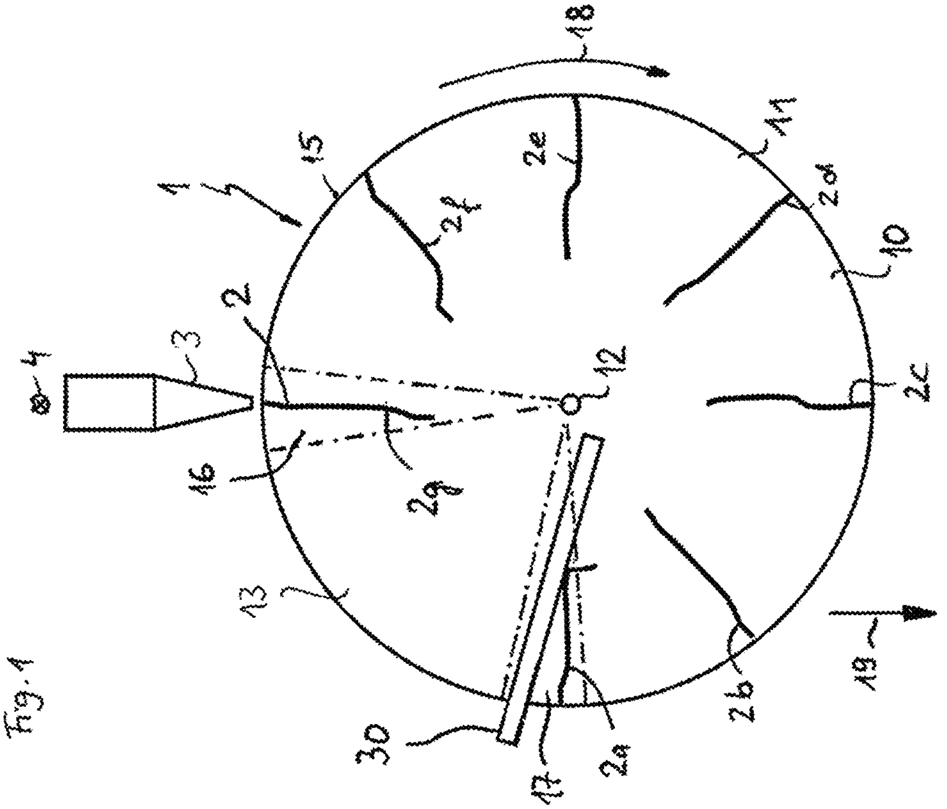
FIG. 1 shows a device for stripping a material residue in a first embodiment.

FIGS. 1 and 2 show a device 1 for stripping a material residue 2 from a metering nozzle 3. The device 1 comprises a stripping element 10 and a separating unit 30. The stripping element 10 is designed in the form of a circular stripping disc 11 which is rotatably mounted about an axis of rotation 12.

The stripping disc 11 has a front main surface 13 and a rear main surface 14, although the rear main surface 14 can only be seen in FIG. 2. A lateral surface 15 extends between the front main surface 13 and the rear main surface 14. A diameter of the stripping disc can be in a range of 50 to 200 mm, preferably between 100 and 150 mm. A thickness of the stripping disc 11 can be in a range of 2 to 25 mm, preferably 3 to 7 mm. The front main surface 13, the rear main surface 14 and/or the lateral surface 15 can be coated with an anti-adhesion material. Alternatively, the stripping disc 11 can be entirely made of the anti-adhesion material.

The metering nozzle 3, through which a flowable material such as liquid adhesive can be applied to a substrate or also to a component (not shown), is located above the stripping disc 11. After an adhesive bead has been applied to the component, a material residue in the faun of a thread 2*a* to 2*g* can remain on the metering nozzle 3, which material residue has to be removed from the metering nozzle 3 before a further adhesive bead is applied. For this purpose, the metering nozzle 3 is guided past the stripping disc 11. The arrow 4 in FIG. 1 and the arrow 5 in FIG. 2 indicate the direction in which the metering nozzle is guided above and past the stripping disc 11. In the illustration in FIG. 2, the metering nozzle 3 is guided above the stripping disc 11 along the arrow 5 from the left to the right. In the illustration in FIG. 1, movement of the metering nozzle 3 extends perpendicularly to and into the drawing plane. A material residue 2 hanging on the metering nozzle 3 is stripped from said nozzle by the movement of the metering nozzle 3 and comes to rest on the front main surface 13. FIGS. 1 and 2 show a state in which the thread denoted by 2*g* has just been stripped from the metering nozzle 3. It is clear from FIG. 2 that the metering nozzle 3 has just passed a front edge 20 between the front main surface 13 and the lateral surface 15.

The stripping disc 11 can be divided into a plurality of segments, only two of which segments are indicated by dash-dotted lines in FIG. 1. A first segment is denoted by 16 and is located in a stripping position. A second segment is denoted by 17 and is located in a separating position.

The segment 16 in the stripping position is used to scrape the material residue to be separated from the metering nozzle 3 from the metering nozzle and receive said residue accordingly when the metering nozzle 3 is passed directly above the segment 16. After the stripping process has been completed, the stripping disc 11 is further rotated in the direction of the arrow 18 until a further segment, not occupied by a material residue, reaches the stripping position (in the case of a face of a clock, the stripping position is located at 12 o'clock).

The second segment 17 is located in the separating position in which the thread 2*a* located there is scraped from the front main surface 13 by the separating unit 30. FIG. 1 indicates that an inner part of the thread 2*a*, seen in the radial direction, has already been separated from the main surface 13 and hangs loosely downward. If the stripping disc 11 is rotated further in direction 18, a middle part and an outer part of the thread 2*a* will also abut the separating unit 30, so that the thread 2*a* is finally completely separated from the main surface 13 of the stripping disc 11 and falls downward in the direction of the arrow 19 due to gravity. A collecting container (not shown), into which the separated thread 2*a* falls, is located below the segment 17 in the separating position.

FIG. 1 shows further threads 2*b* to 2*f* which have already been deposited on the stripping disc 11 by prior stripping processes. Between the individual stripping processes, the stripping disc 11 was rotated further by a certain angle of rotation. Viewed in the circumferential direction, the distance between adjacent threads on the stripping disc 11 can be significantly smaller than shown in FIG. 1. The shown threads 2*a* to 2*g* are therefore only exemplary of a plurality of threads which are applied to the front main surface 13 by the metering nozzle 3 being repeatedly passed above the stripping disc 11 and the intermediate further rotation of the stripping disc 11. For example, the distance between two adjacent threads seen in the circumferential direction may be only 2 to 5°. Accordingly, the segments of the stripping disc 11 may also only extend over this circumferential range of 2 to 5°.

Viewed in direction of rotation 18, no threads are located behind the separating unit 30 (see region between 9 and 12 o'clock). Thus, starting from the state shown in FIG. 1, free segments can be brought into the stripping position by a further rotation of the stripping disc 11, in order to receive further material residues 2 in said segments. As a result of the separating unit 30, the stripping disc 11 can perform one full rotation after the other, which makes continuous use of the device 1 possible. Since the stripping disc 30 is automatically freed from the threads 2*a* to 2*g* during normal operation of the device 1, set-up times for cleaning the device 1 or for replacing individual components of the device 1 can be significantly reduced.

In the embodiment shown here, the separating position is offset by approximately 270° with respect to the stripping position. This means that the stripping disc 11, in correspondingly small steps or also continuously, would have to be rotated by a total of 270° in order for the segment 16 to reach the separating position starting from the stripping position.

In FIG. 2, for the sake of clarity, only the thread 2*g* just stripped from the metering nozzle 3 and the lowermost thread 2*c*, which has been stripped some time before thread 2*g*, are shown. The stripping disc 11 is rotationally driven by a drive unit 50 which comprises a motor in the form of a pneumatic pivot drive 51, a freewheel 52, and a drive shaft 53. The pneumatic pivot drive 51 performs a first rotary movement in the direction of the direction of rotation 18 and a second rotary movement counter to the first rotary movement. The freewheel 52 is designed such that the second rotary movement of the pivot drive 51 is not transmitted to the drive shaft 53. The drive shaft 53 and the stripping disc 11 connected thereto for conjoint rotation are thus stationary when the pivot drive 51 moves counter to the direction of rotation 18. A transmission (not shown here), which can be provided between the pivot drive 51 and the drive shaft 53, preferably has a transmission ratio, such that the ratio of the angle of rotation of the pivot drive 51 to the angle of rotation of the stripping disc 11 is greater than 1.

It can also be seen in FIG. 2 that the separating unit 30 rests not only against the front main surface 13 but also against the rear main surface 14. As a result, material residues or parts of material residues that become attached to the rear main surface 14 during the stripping process can also be separated by the separating unit 30.

In order to change the stripping process such that the material residues 2 as far as possible do not reach the rear main surface 14, the axis of rotation 12 extending horizontally in FIG. 2 can be slightly inclined with respect to the horizontal such that the front main surface 13 is pivoted slightly upward. The rear main surface 14 is in this case rotated slightly downward. Due to this inclined axis of rotation, a rear edge 21 is also offset slightly downward with respect to the front edge 20, as a result of which the distance of the rear edge from the metering nozzle 3 is increased.

Figure 4:
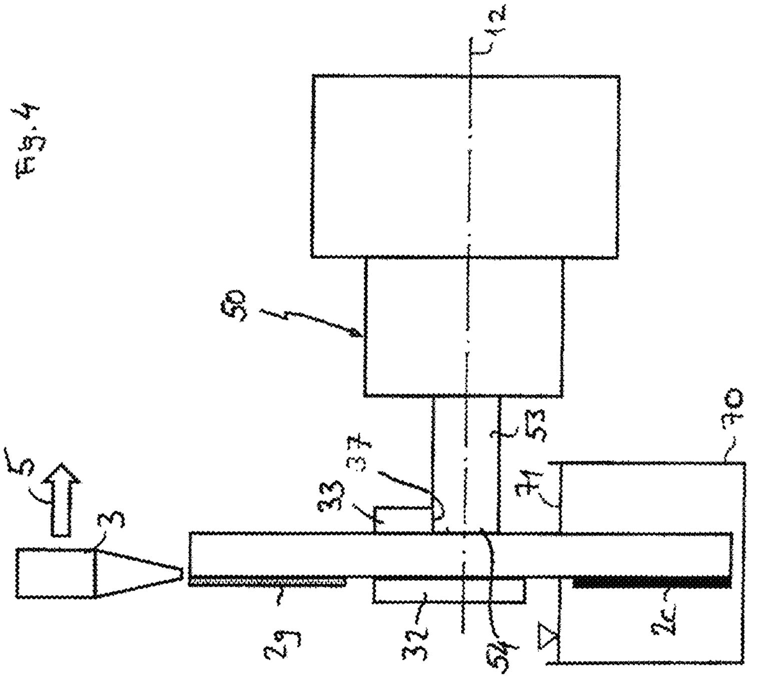
FIG. 4 shows the embodiment from FIG. 3 from the side.
Figure 3:
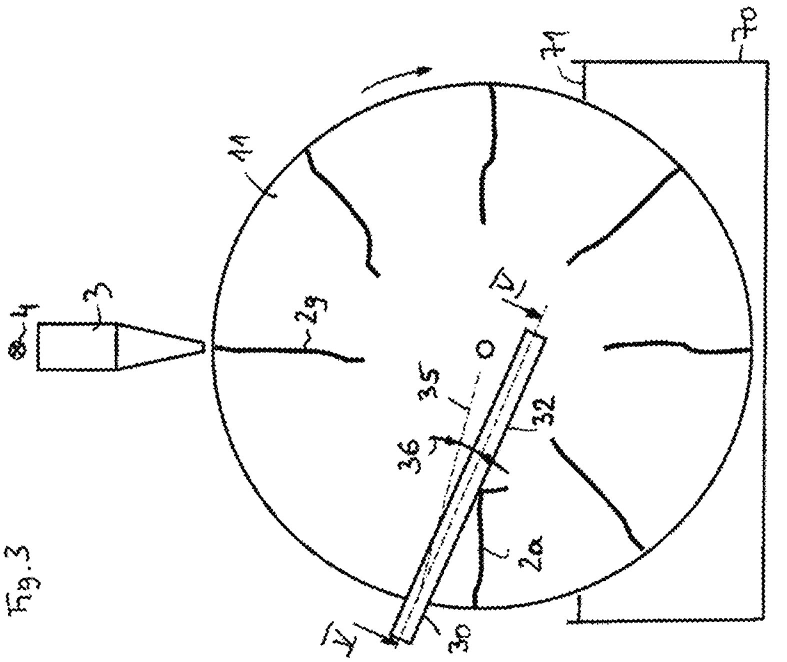
FIG. 3 shows a second embodiment of the invention.

FIGS. 3 and 4 show a further embodiment of the device 1 according to the invention, in which components and features which are similar or identical to the components and features of FIGS. 1 and 2 are provided with the same reference signs. In the description of FIGS. 3 and 4, substantially only the differences from the first embodiment of FIGS. 1 and 2 are described. With regard to the common features, reference is made to the previous description of the drawings.

The device 1 according to the embodiment of FIGS. 3 and 4 comprises a dip tank 70 into which a lower part of the stripping disc 11 projects. The dip tank 70 is filled with a liquid 71, preferably with water. Each thread 2*a* to 2*g* that has been stripped from the metering nozzle 3 and deposited on the front main surface 13 thus passes through the dip tank 70 filled with the liquid 71.

If the material which is metered through the metering nozzle 3 is a single-component adhesive which hardens by means of humidity or water (steam), the font 70 accelerates the hardening of the threads 2*a* to 2*g* on the stripping disc 11. As a result, it is possible to prevent the separating unit 30 from becoming clogged with tacky material over a long period of time and no longer functioning reliably, due to insufficiently hardened threads which still have a tacky surface.

When using a two-component adhesive, the liquid 71 in the dip tank can have an increased temperature in order to apply heat to the threads. The heat can accelerate the reaction between the two components of the adhesive. Here too, the dip tank is used to accelerate the hardening of the threads on the path from the stripping position to the separating position. Alternatively or additionally, the stripping disc 11 can also be heated directly.

Regardless of the influence on the hardening, the dip tank 70 can also be used to wet the stripping disc 11 with the liquid 71 in order to reduce the adhesion of the individual threads to the stripping disc 11. However, this does not primarily relate to the already deposited threads which pass through the dip tank, but rather to the future threads, which, during continuous operation of the device 1, reach the then wetted surface of the stripping disc 11 after the stripping disc 11 has passed through the dip tank 70.

Figure 5:
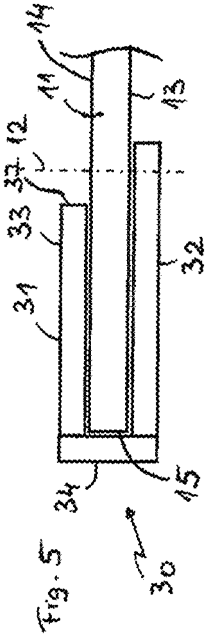
FIG. 5 shows a separating unit along the line V-V in FIG. 3.

In comparison with the embodiment in FIGS. 1 and 2, the position and orientation of the separating unit 30 are slightly changed in the embodiment in FIGS. 3 and 4. FIG. 5 is a section along the line V-V in FIG. 4. The separating unit 30 has a U-shaped scraping blade 31 having a front blade leg 32, a rear blade leg 33 and a blade base 34. The front ring leg 33 rests against the front main surface 13 of the stripping disc 11 and is used to scrape the threads 2*a* to 2*g*, which adhere to the front main surface 13. The rear main surface 14 is freed from any adhering material residues by the rear blade leg 33. The blade base 34 is used to clean the lateral surface 15.

The front blade leg 32 and the rear blade leg 33 can be of equal length or, as shown here, can also have different lengths. In the embodiment shown here, the front blade leg is longer than the rear blade leg 32 and projects slightly beyond the center point or the axis of rotation 12 of the stripping disc 11. This ensures that the entire front main surface 13 is freed from the threads 2*a* to 2*g*.

It can be seen in FIG. 3 that at least the front blade leg 32 and preferably also the rear blade leg 33 enclose an angle 36, which can be 2 to 20°, with respect to a radial connecting line 35 which connects the blade base 34 to the axis of rotation 12. This ensures that a thread 2*a* to 2*g* that extends substantially in the radial direction on the stripping disc 11 abuts the front blade leg 32 successively. As a result, undesired force peaks can be prevented during the separation or scraping of the threads 2*a* to 2*g*.

A free end 37 of the rear blade leg 33 can be used to free an end 54 of the drive shaft 53 facing the stripping disc 11 (see FIG. 4) from any residual materials.

The invention claimed is:

1. A method for stripping a material residue from a metering nozzle, the metering nozzle with the material residue being guided past a stripping element, such that the material residue comes into contact with the stripping element and is stripped from the metering nozzle, characterized in that the stripping element performs a closed rotational movement that is a rotary movement about an axis of rotation by means of which a segment of the stripping element: —first reaches a stripping position in which the material residue is stripped from the metering nozzle and at least some of the material residue remains adhering on a surface of the segment extending in a radial direction with respect to the axis of rotation, —is then guided with the material residue adhering thereon to a separating position, in which a separating unit is used to separate the material residue from the segment of the stripping element, and —is guided back to the stripping position to receive a further material residue;

the stripping element is in the form of a stripping disc rotatably mounted about the axis of rotation, and the separating unit has at least one scraping blade which rests against the stripping disc, wherein the material residue is separated by the at least one scraping blade when the stripping disc rotates; the at least one scraping blade is U-shaped and has two blade legs and blade base, the two blade legs resting against a front main surface and against a rear main surface of the stripping disc, respectively, and the blade base resting against a lateral surface of the stripping disc.

2. The method according to claim 1, characterized in that a sealing or adhesive material is metered by means of the metering nozzle.

3. The method according to claim 2, characterized in that a period of time for a rotational movement of the segment from the stripping position to the separating position is greater than the tack-free time of the sealing or adhesive material.

4. The method according to claim 1, characterized in that the rotational movement is clocked.

5. The method according to claim 1, characterized in that the rotating stripping element is driven by a pneumatic pivot drive.

6. The method according to claim 1, characterized in that the stripping element is at least partially coated with an anti-adhesion material or produced from an anti-adhesion material.

7. The method according to claim 1, characterized in that the separating device has the at least one scraping blade which rests against the rotating stripping element such that the material residue applied to the segment is pressed against the at least one scraping blade by the rotational movement of the stripping element.

8. The method according to claim 7, characterized in that the material residue is deposited on the segment substantially in the form of an elongate thread, the thread being successively guided to the scraping blade in the separating position.

9. The method according to claim 8, characterized in that the material residue is subjected to water, steam and/or heat downstream of the stripping position and upstream of the separating position.

10. The method according to claim 1, characterized in that the blade legs extend from the blade base radially with respect to the axis of rotation of the stripping disc.

11. The method according to claim 10, characterized in that a main extension of the blade legs and a radial connecting line between the axis of rotation and the blade base enclose an angle.

12. A method for stripping a material residue from a metering nozzle, the metering nozzle with the material residue being guided past a stripping element, such that the material residue comes into contact with the stripping element and is stripped from the metering nozzle, characterized in that the stripping element performs a closed rotational movement that is a rotary movement about an axis of rotation by means of which a segment of the stripping element:—first reaches a stripping position in which the material residue is stripped from the metering nozzle and at least some of the material residue remains adhering on a surface of the segment extending in a radial direction with respect to the axis of rotation, —is then guided with the material residue adhering thereon to a separating position, in which a separating unit is used to separate the material residue from the segment of the stripping element, and —is guided back to the stripping position to receive a further material residue;

the stripping element is in the form of a stripping disc rotatably mounted about the axis of rotation, and the separating unit has at least one scraping blade which rests against the stripping disc, wherein the material residue is separated by the at least one scraping blade when the stripping disc rotates; the at least one scraping blade is L-shaped and has two blade legs, wherein one blade leg rests against a front main surface and the other blade leg rests against a lateral surface of the stripping disc.

* * * * *